US010049837B2

(12) United States Patent
Kingston

(10) Patent No.: US 10,049,837 B2
(45) Date of Patent: Aug. 14, 2018

(54) SYSTEM AND METHOD FOR VENTILATING AND ISOLATING ELECTRICAL EQUIPMENT

(71) Applicant: Rockwell Automation Technologies, Inc., Mayfield Heights, OH (US)

(72) Inventor: Murray Peter Kingston, Cambridge (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 265 days.

(21) Appl. No.: 14/918,127

(22) Filed: Oct. 20, 2015

(65) Prior Publication Data

US 2016/0042896 A1 Feb. 11, 2016

Related U.S. Application Data

(63) Continuation-in-part of application No. 12/846,511, filed on Jul. 29, 2010, now Pat. No. 9,609,769.

(51) Int. Cl.
| | |
|---|---|
| *H01H 33/53* | (2006.01) |
| *H02B 1/56* | (2006.01) |
| *H02B 13/025* | (2006.01) |

(52) U.S. Cl.
CPC ............ *H01H 33/53* (2013.01); *H02B 1/565* (2013.01); *H02B 13/025* (2013.01)

(58) Field of Classification Search
CPC .................................................... H02B 13/045
USPC ........................................................ 454/184
See application file for complete search history.

(56) References Cited

U.S. PATENT DOCUMENTS

| | | | | |
|---|---|---|---|---|
| 5,414,584 | A | * | 5/1995 | Young ................... H01H 9/342 361/110 |
| 6,100,778 | A | * | 8/2000 | Deylitz ................... H01H 9/34 218/156 |
| 6,222,147 | B1 | | 4/2001 | Doughty et al. |
| 6,342,004 | B1 | | 1/2002 | Lattimore et al. |
| 6,646,867 | B1 | | 11/2003 | Tuttle et al. |
| 6,680,847 | B2 | | 1/2004 | Heard |
| 6,977,354 | B1 | * | 12/2005 | Shea ...................... H01H 9/342 218/157 |
| 7,095,606 | B2 | | 8/2006 | Mahn et al. |
| 7,140,702 | B2 | | 11/2006 | Byron et al. |
| 7,236,352 | B2 | | 6/2007 | Dalis |

(Continued)

*Primary Examiner* — Gregory Huson
*Assistant Examiner* — Martha Becton
(74) *Attorney, Agent, or Firm* — Fletcher Yoder, P.C.

(57) ABSTRACT

An arc resistant system includes an enclosure that houses electrical equipment and includes an intake isolation assembly configured to deform in response to an arc fault pressure wave to substantially block an intake ventilation opening of the enclosure. The enclosure also includes a first pressure relief assembly configured to open in response to the arc fault pressure wave to allow arc products to exit the enclosure and to enter a ventilation box. The ventilation box is coupled to the enclosure and includes an exhaust isolation assembly configured to deform in response to the arc fault pressure wave to substantially block an exhaust ventilation opening of the ventilation box. The ventilation box also includes a second pressure relief assembly configured to open in response to the arc fault pressure wave to allow the arc products to exit the ventilation box.

20 Claims, 9 Drawing Sheets

(56) References Cited

U.S. PATENT DOCUMENTS

| | | | | |
|---|---|---|---|---|
| 7,576,985 | B2* | 8/2009 | Kingston | H02B 13/025 |
| | | | | 165/104.33 |
| D651,982 | S * | 1/2012 | Karandikar | H02B 13/025 |
| | | | | D13/158 |
| 8,101,881 | B2* | 1/2012 | Miller | H02B 13/025 |
| | | | | 218/157 |
| 8,456,838 | B2* | 6/2013 | Ballard | H01F 27/02 |
| | | | | 361/676 |
| 9,214,271 | B2* | 12/2015 | Ballard | H01F 27/02 |
| 9,609,769 | B2* | 3/2017 | Kingston | H05K 5/0213 |
| 2002/0117901 | A1 | 8/2002 | Spivey et al. | |
| 2003/0025586 | A1* | 2/2003 | Parry | H01H 85/43 |
| | | | | 337/273 |
| 2003/0168433 | A1* | 9/2003 | Kurzmann | H01H 9/342 |
| | | | | 218/157 |
| 2007/0097604 | A1 | 5/2007 | Bruski et al. | |
| 2009/0185333 | A1 | 7/2009 | Coomer et al. | |
| 2012/0120558 | A1* | 5/2012 | Raabe | H01H 9/342 |
| | | | | 361/619 |

* cited by examiner

_US 10,049,837 B2_

SYSTEM AND METHOD FOR VENTILATING AND ISOLATING ELECTRICAL EQUIPMENT

CROSS REFERENCE TO RELATED APPLICATIONS

This application is a continuation-in-part of U.S. patent application Ser. No. 12/846,511, entitled "SYSTEM AND METHOD FOR VENTILATING AND ISOLATING ELECTRICAL EQUIPMENT" filed Jul. 29, 2010, which is herein incorporated by reference in its entirety for all purposes.

BACKGROUND

This disclosure relates generally to the field of electrical systems and enclosures for electrical systems. Specifically, this disclosure relates to techniques for ventilating and isolating electrical systems that can experience arc faults during operation.

BRIEF DESCRIPTION

In an embodiment, an arc resistant system includes an enclosure that houses electrical equipment and includes an intake isolation assembly configured to deform in response to an arc fault pressure wave to substantially block an intake ventilation opening of the enclosure. The enclosure also includes a first pressure relief assembly configured to open in response to the arc fault pressure wave to allow arc products to exit the enclosure and to enter a ventilation box. The ventilation box is coupled to the enclosure and includes an exhaust isolation assembly configured to deform in response to the arc fault pressure wave to substantially block an exhaust ventilation opening of the ventilation box. The ventilation box also includes a second pressure relief assembly configured to open in response to the arc fault pressure wave to allow the arc products to exit the ventilation box.

In an embodiment, an arc resistant system includes a ventilation box having a first side configured to be coupled to an enclosure of the arc resistant system that houses electrical equipment, wherein the ventilation box is configured to receive exhaust air or arc products of the electrical equipment from the enclosure via the first side. The ventilation box includes a second side having an exhaust isolation assembly coupled about an exhaust ventilation opening of the ventilation box, wherein the exhaust isolation assembly is configured to deform to substantially block the exhaust ventilation opening in response to the ventilation box receiving the arc products of the electrical equipment. The ventilation box includes a third side configured to be coupled to an arc chimney of the arc resistant system, wherein the third side includes a pressure relief assembly configured to open to allow the arc products to exit the ventilation box and to enter the arc chimney in response to the ventilation box receiving the arc products of the electrical equipment.

In another embodiment, a method of operating an arc resistant system includes operating electrical equipment within an enclosure of the arc resistant system that is coupled to a ventilation box of the arc resistant system. The method includes operating a fan coupled to the enclosure, wherein the fan draws air into an intake ventilation opening of the enclosure and exhausts air from an exhaust ventilation opening of the ventilation box to remove heat generated by the electrical equipment during normal operation. The method includes closing an intake isolation assembly to substantially block the intake ventilation opening of the enclosure in response to a pressure wave generated as arc products are released from an arc fault of the electrical equipment. The method includes opening a first pressure relief assembly that is coupled to the enclosure to allow the arc products to exit the enclosure and to enter the ventilation box in response to the pressure wave. The method includes closing an exhaust ventilation assembly to substantially block the exhaust ventilation opening of the ventilation box in response to the pressure wave. The method further includes opening a second pressure relief assembly that is coupled to the ventilation box to allow the arc products to exit the ventilation box in response to the pressure wave.

DRAWINGS

These and other features, aspects, and advantages of the present invention will become better understood when the following detailed description is read with reference to the accompanying drawings in which like characters represent like parts throughout the drawings, wherein.

Figure 6:
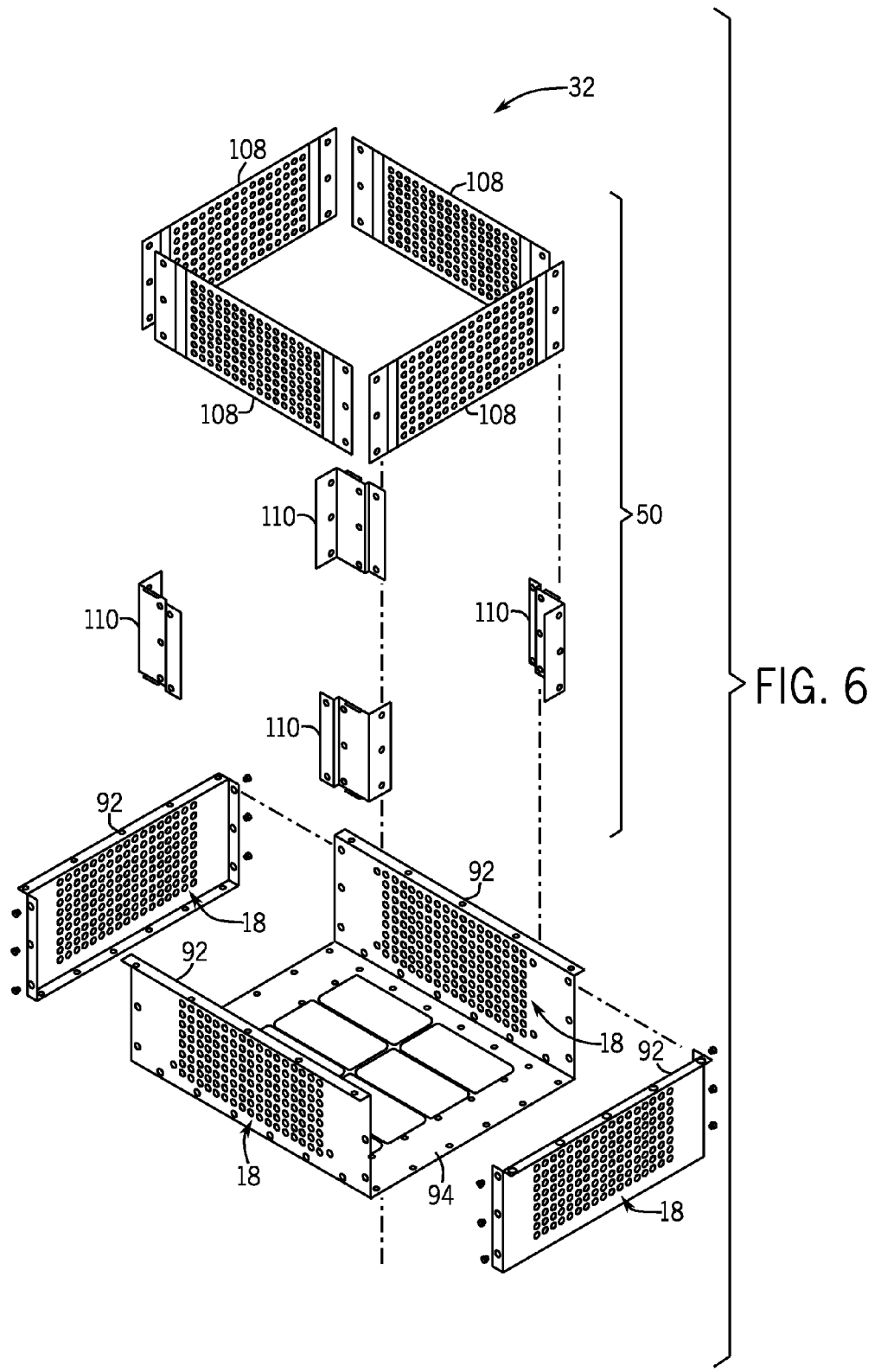
Figure 7:
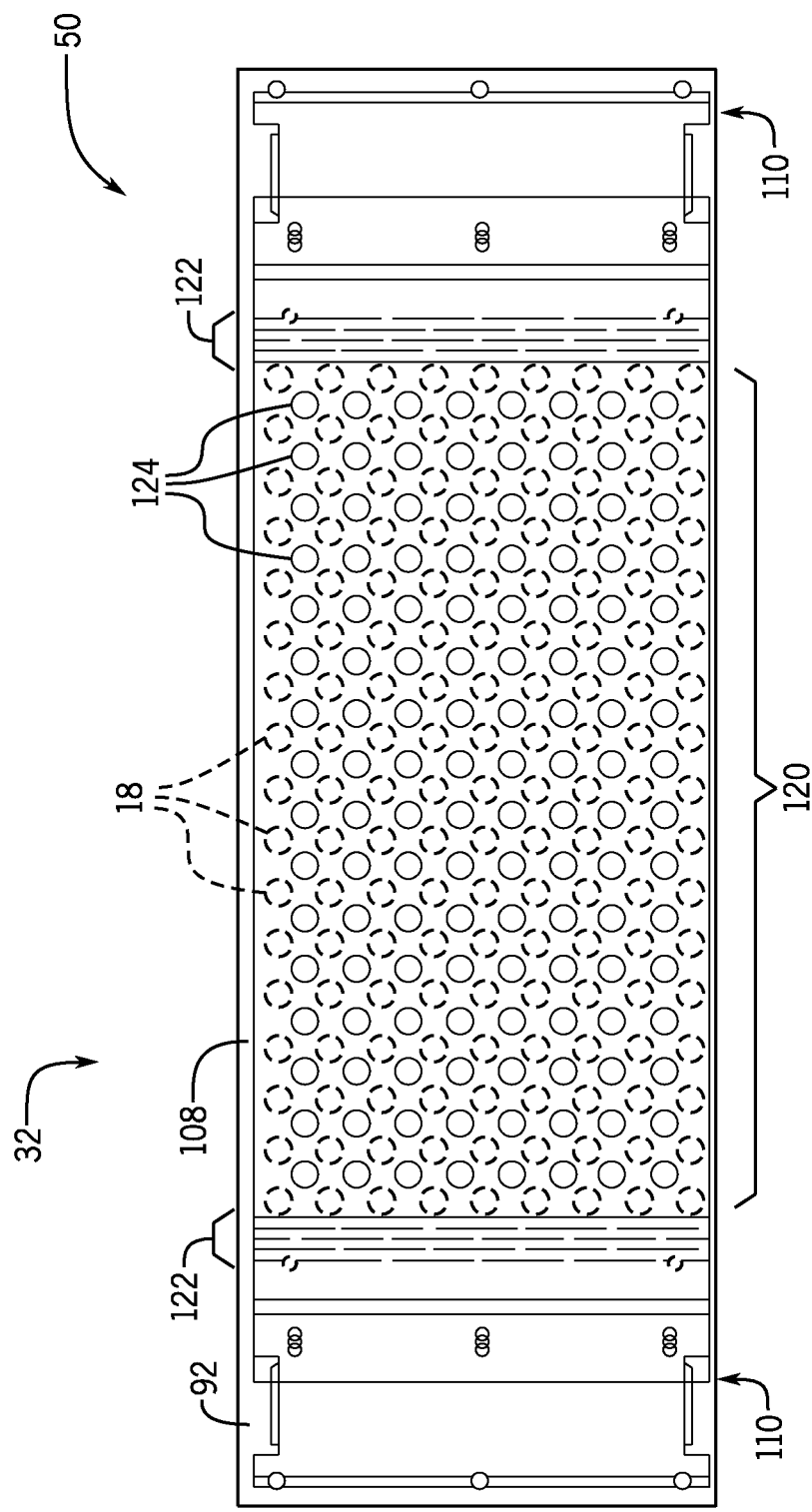
Figure 8:
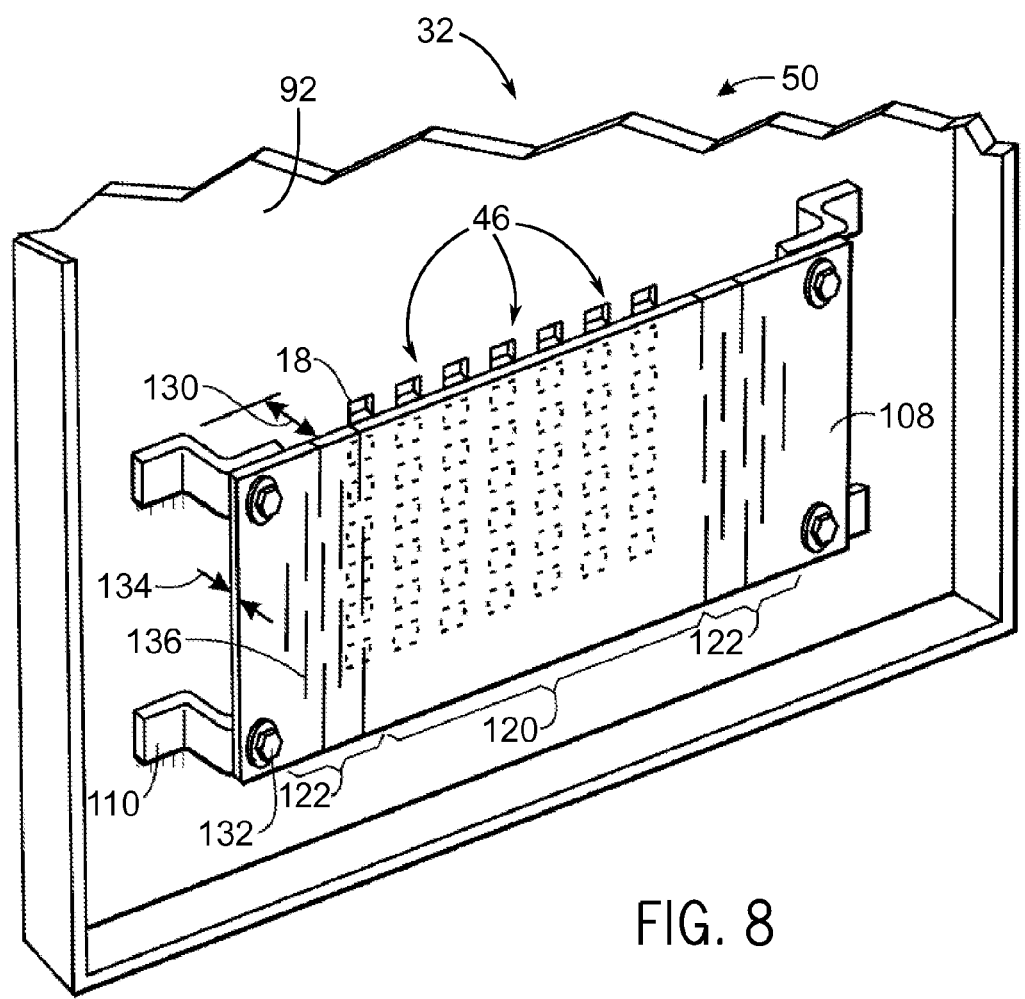
Figure 9:
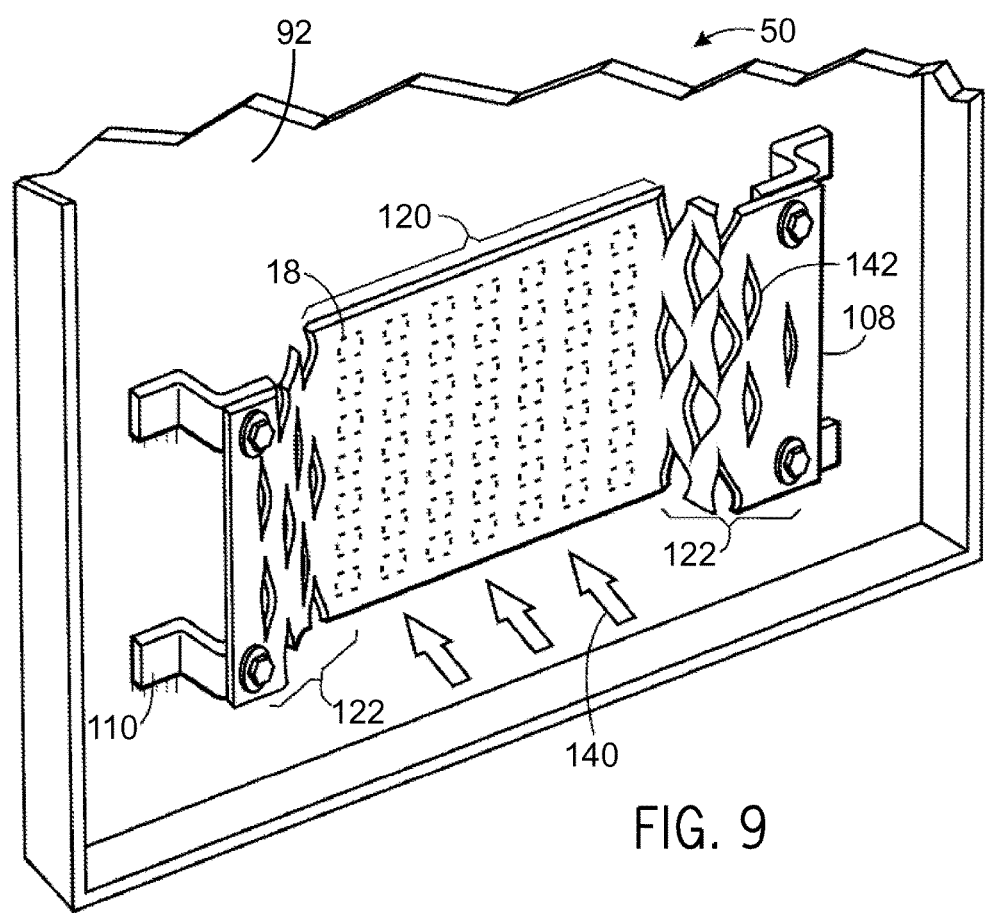

FIG. 6 an exploded perspective view of a ventilation box of an arc resistant system, in accordance with an embodiment of the present disclosure;

FIG. 7 is a schematic of an exhaust isolation assembly of an arc resistant system, in accordance with an embodiment of the present disclosure;

FIG. 8 is a perspective view of an exhaust isolation assembly of an arc resistant system in an open position, in accordance with an embodiment of the present disclosure; and FIG. 9 is a perspective view the exhaust isolation assembly of FIG. 8 in a closed position after an arc fault has occurred, in accordance with an embodiment of the present disclosure.

DETAILED DESCRIPTION

Electrical systems can be complex and widely divergent in design and operation. Electrical power from these electrical systems may be applied to loads, such as electric motors and other equipment. Within a given electrical system, a variety of components or devices may be used in the operation and control of the loads. For example, an electrical system may include one or more motor starters, overload relays, circuit breakers, and solid-state motor control devices, such as variable frequency drives, programmable logic controllers, and so forth.

Electrical systems are used in residences, commercial applications, and a variety of industries to provide, manage, and/or control electrical power provided to equipment, machines, and/or processes. These electrical systems may be installed in enclosures for a number of reasons. For example, enclosures may help to protect the electrical systems from external conditions, such as dust, debris, animals, weather, unauthorized access, collisions, and so forth. In addition, the enclosures may help to contain and/or redirect internal conditions associated with the electrical systems. For example, arcing faults may create heat, gases, melted metal, shrapnel, and other debris that may be ejected by the affected electrical system. Thus, enclosures may help to protect not only electrical equipment, but also nearby personnel and/or equipment.

Arcing can be an issue within many electrical systems. Arcing (which may also be referred to as an arc, arc fault, arcing fault, arc flash, or arcing flash) can be thought of as an electrical conduction or short-circuit through gas or air. Initiation of an arc fault may be caused by a momentary or loose connection, build-up of foreign matter, such as dust or dirt mixed with moisture, insulation failure, or a short-circuit (e.g., a foreign object, such as a tool or a rodent, establishing an unwanted connection between phases or from a phase to ground) that causes the arc to be drawn. Once initiated, some arcing faults proceed in a substantially continuous manner. Other types of arcing faults, such as intermittent failures between phases or phase-to-ground, can be discontinuous currents that alternately strike, extinguish, and strike again.

An arc fault is an intense thermal event (e.g., temperatures up to 8800° C.) that causes melting and vaporization of metals. An arcing fault is a rapid chain of events releasing tremendous energy in a fraction of a second (e.g., less than 100 milliseconds, less than 50 milliseconds, less than 16 milliseconds, approximately 8 milliseconds) and is known for quick propagation. Once arcing begins, heat is generated and ionized gases are produced that provide a medium by which the arcing fault can propagate. An arc may travel along one conductor and jump to other conductors, melting and/or vaporizing the conductors. As a result, more ionized gas and arcing may be created, engulfing all three phases and reaching the power buses. A phase-to-ground or phase-to-phase arcing fault can quickly escalate into a three-phase arcing fault as a result of the extensive cloud of conductive metal vapor that can surround the power leads and terminals. The hot gases, metal vapors, and intense heat released during an arc fault are collectively referred to herein as arc product. If not properly contained and vented, these arc products can cause substantial issues. As used herein, "arc resistant" refers to a system that is designed to contain and direct the arc products released during an arc fault in ways that minimize undesirable results to nearby assets.

Since electrical systems also produce a substantial amount of heat during normal operation, electrical systems can be ventilated either passively (e.g., via convection) or actively (e.g., using forced air provided by a fan or compressor) for cooling purposes. As such, the enclosures of such electrical systems may include intake ventilation openings, usually disposed near the bottom of the enclosure, that allow relatively cool air to enter the enclosure. Similarly, such enclosure may also include exhaust ventilation openings, usually disposed near the top of the enclosure, that allow air that has absorbed heat from the operating electrical equipment to exit the enclosure. When the electrical system is operating normally, the warn air exiting the enclosure does not typically contain arc products. However, once an arc fault occurs, arc products will rapidly attempt to escape the enclosure through the various ventilation openings, potentially damaging nearby equipment. As such, traditional arc resistant equipment designs generally have limited or no ventilation openings due to the risk of arc faults.

With the foregoing in mind, present embodiments are directed toward arc resistant electrical systems that enable suitable ventilation for cooling (e.g., forced-air cooling) of the electrical system during normal operation, while also preventing the escape of arc products in the event of an arc fault. The ventilation openings of the embodiments described below include isolation assemblies that respond to the pressure change produced by an arc fault to block the escape of arc products into the surrounding environment. Furthermore, present embodiments include pressure relief assemblies that open in response to the pressure change produced by the arc fault to allow the arc products to be released through an arc duct, which routes the arc products to a suitable location away from equipment and personnel. Both the isolation assemblies and pressure relief assemblies of the disclosed embodiments are robust, passive mechanisms that operate using the force provided by the arc fault pressure wave, and therefore do not require power (e.g., electrical power, mechanical springs) or a control system (e.g., controller, sensors, actuators) to function. Further, both the isolation assemblies and pressure relief assemblies of the disclosed embodiments avoid the use of hinges and spring-loaded vanes that could increase the complexity and cost of the system and can be rendered impaired or inoperable due to corrosion and/or seizure.

Figure 1:
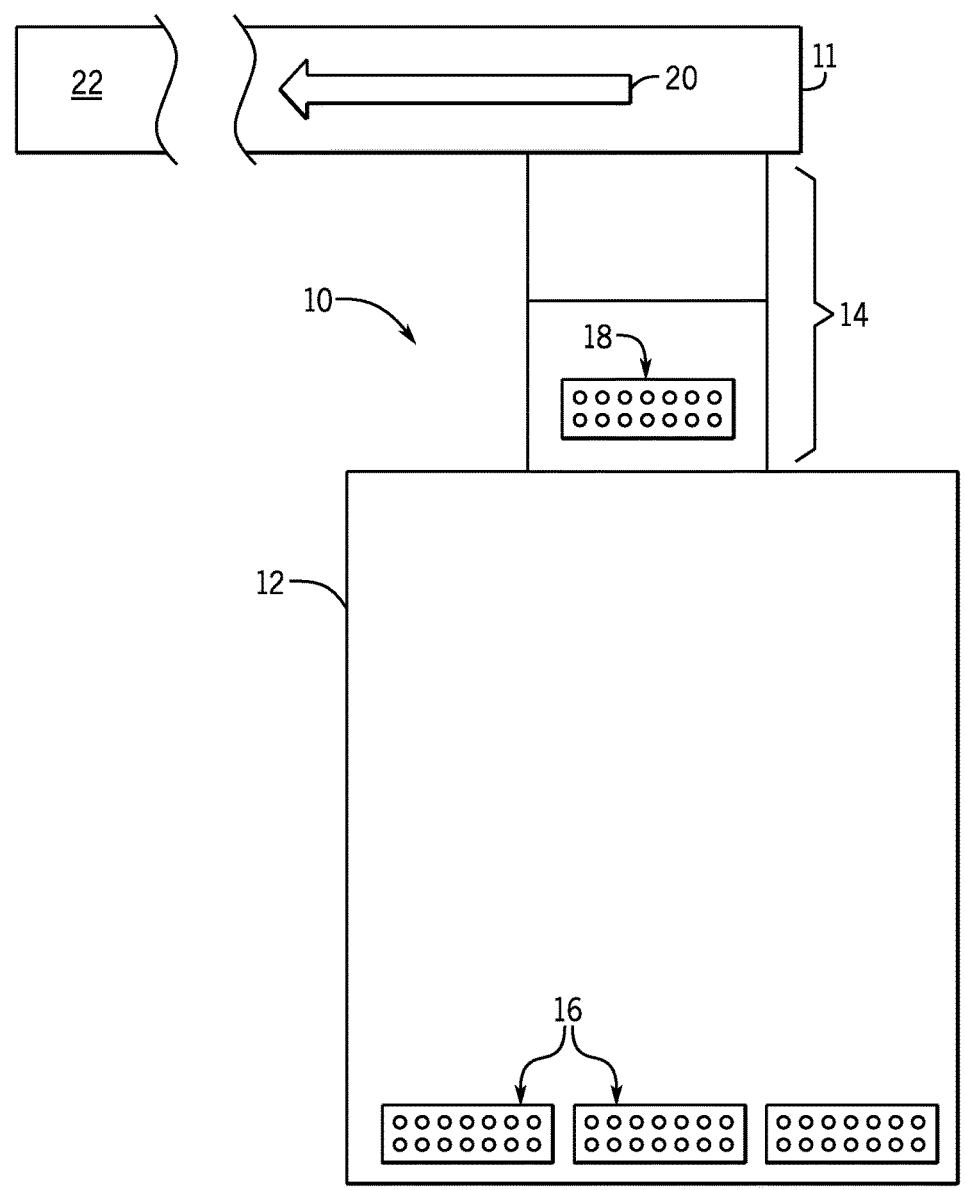
FIG. 1 is a front view of an arc resistant electrical system coupled to an arc duct, in accordance with an embodiment of the present disclosure.

FIG. 1 is a front view of an arc resistant electrical system 10 coupled to an arc duct 11, in accordance with an embodiment of the present disclosure. The arc resistant electrical system 10 includes an enclosure 12 that houses electrical equipment, and a ventilation assembly 14 that couples the enclosure 12 to the arc duct 11. The electrical equipment disposed within the enclosure 12 (not shown) may include, for example, variable frequency drives, power centers, motor starters, motor controllers, switchgear, distribution gear, protective devices, control devices, switchgear, controllers, switchboards, switchgear, panelboards, pull boxes, junction boxes, or any other suitable electrical equipment. This electrical equipment may include high-voltage equipment, medium-voltage equipment, low-voltage equipment, or combinations thereof. The arc duct 11 provides an outlet for arc products generated by the electrical equipment in the case of an arc fault; however, as discussed below, the arc duct 11 may not exchange air with the enclosure 12 or the ventilation assembly 14 during normal operation of the electrical equipment. Additionally, in certain embodiments, the enclosure 12 may includes access mechanisms (e.g., panels, doors, handles, knobs, locks), input mechanisms (e.g., buttons, knobs, touchscreens), output mechanisms (e.g., light emitting diodes (LED), liquid crystal displays (LCD) displays), that may be used to maintain, control, and monitor operation of the electrical equipment within the enclosure 12, in accordance with the present disclosure.

Without adequate ventilation, the heat generated by the electrical equipment during operation may cause internal temperatures of the enclosure 12 to exceed maximum recommended guidelines established for longevity of the electrical equipment. To provide improved ventilation, the illustrated enclosure 12 includes intake ventilation openings 16 that enable relatively cool air to enter the arc resistant system 10. Further, the ventilation assembly 14 includes exhaust ventilation openings 18 that enable relatively warm air to exit the arc resistant system 10.

In certain embodiments, the intake ventilation openings 16 may be located on other surfaces (e.g., sides, back) of the enclosure 12, and the exhaust ventilation openings 18 may be located on other surfaces (e.g., other sides) of the ventilation system 14, in accordance with the present disclosure. Moreover, the number, shape, pattern, arrangement, size, and/or location of the intake and exhaust ventilation openings 16 and 18 may generally be designed to provide a desired level of ventilation of the enclosure 12. Furthermore, as described in detail below, isolation assemblies are located inside the enclosure 12 and directly behind the intake ventilation openings 16, as well as inside the ventilation assembly 14 and directly behind the exhaust ventilation openings 18. As described below, during normal operation of the electrical equipment, these isolation assemblies allow air to enter and exit the arc resistant system 10 with little or no resistance. However, in the event of an arc fault, these isolation assemblies block substantially all (e.g., greater than 95%, greater than 98%, greater than 99%) of the arc products from exiting the arc resistant system 10.

In the event of an arc fault within the enclosure 12, the arc duct 11 is generally designed to receive and route arc products away from the arc resistant system 10, as illustrated by the arrow 20. However, as discussed below, when the electrical equipment within the enclosure 12 is operating properly, the arc duct 11 does not receive (e.g., is isolated from) air flow within the enclosure 12. While only a single enclosure 12 is illustrated FIG. 1, it may be noted that any number of enclosures 12 can be coupled to the same arc duct 11, in certain embodiments. In one embodiment, the arc duct 11 may be formed from sheet metal ductwork. In other embodiments, the arc duct 11 may be formed from aluminum or other metals, plastics, composites, ceramics, cermets, or any other suitable material. The illustrated arc duct 11 includes an outlet 22 through which arc products can exit the arc duct 11 away from other equipment or personnel (e.g., into a containment room having reinforced walls, outside of a structure or building).

Figure 2:
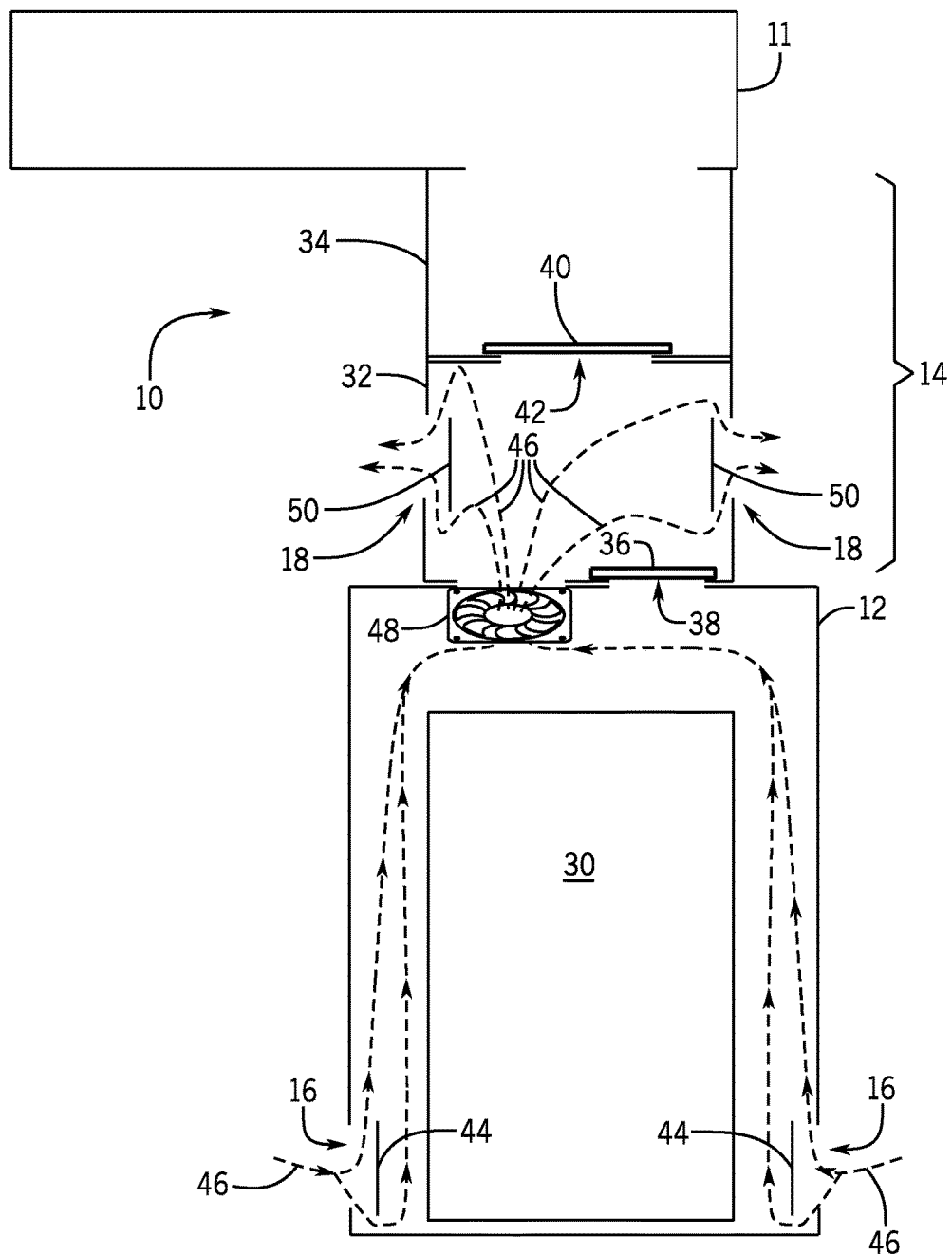
FIG. 2 is a cross-sectional schematic of an arc resistant system during normal operation of the electrical equipment contained within, in accordance with an embodiment of the present disclosure.

FIG. 2 is a cross-sectional schematic of an arc resistant system 10 during normal operation of the electrical equipment 30 contained within, in accordance with an embodiment of the present disclosure. The embodiment of the arc resistant system 10 illustrated in FIG. 2 includes an enclosure 12 that houses the electrical equipment 30. The illustrated embodiment also has a ventilation assembly 14, including a ventilation box 32 and an arc chimney 34, that extends between the enclosure 12 and the arc duct 11. The illustrated enclosure 12 includes a pressure relief assembly 36, discussed in greater detail below, which is positioned over an arc ventilation opening 38 disposed at the top of the enclosure 12 and resists airflow between the enclosure 12 and the ventilation box 32 during normal operation of the electrical equipment 30. The illustrated ventilation box 32 also includes a pressure relief assembly 40, discussed in greater detail below, which is positioned over the arc ventilation opening 42 disposed at the top of the ventilation box 32 and resists airflow between the ventilation box 32, via the arc ventilation opening 38, and the arc chimney 34 during normal operation of the electrical equipment 30.

The enclosure 12 of the arc resistant system 10 illustrated in FIG. 2 includes intake ventilation openings 16 having intake isolation assemblies 44 attached thereto, as discussed in greater detail below. As illustrated by the arrows 46, relatively cool air enters the enclosure 12, traversing the intake ventilation openings 16 and their corresponding intake isolation assemblies 44, as a result of the operation of a fan 48 disposed in the enclosure 12 of the arc resistant system 10. Once inside the enclosure 12, this cool air absorbs heat generated by the electrical equipment 30 during normal operation, and the operation of the fan 48 subsequently pushes the warmed air into the ventilation box 32. From there, as illustrated by the arrows 46, the warmed air is pushed past the exhaust isolation assemblies 50 (which are discussed in greater detail below) and is expelled from the arc resistant system 10 through the exhaust ventilation openings 18.

Figure 3:
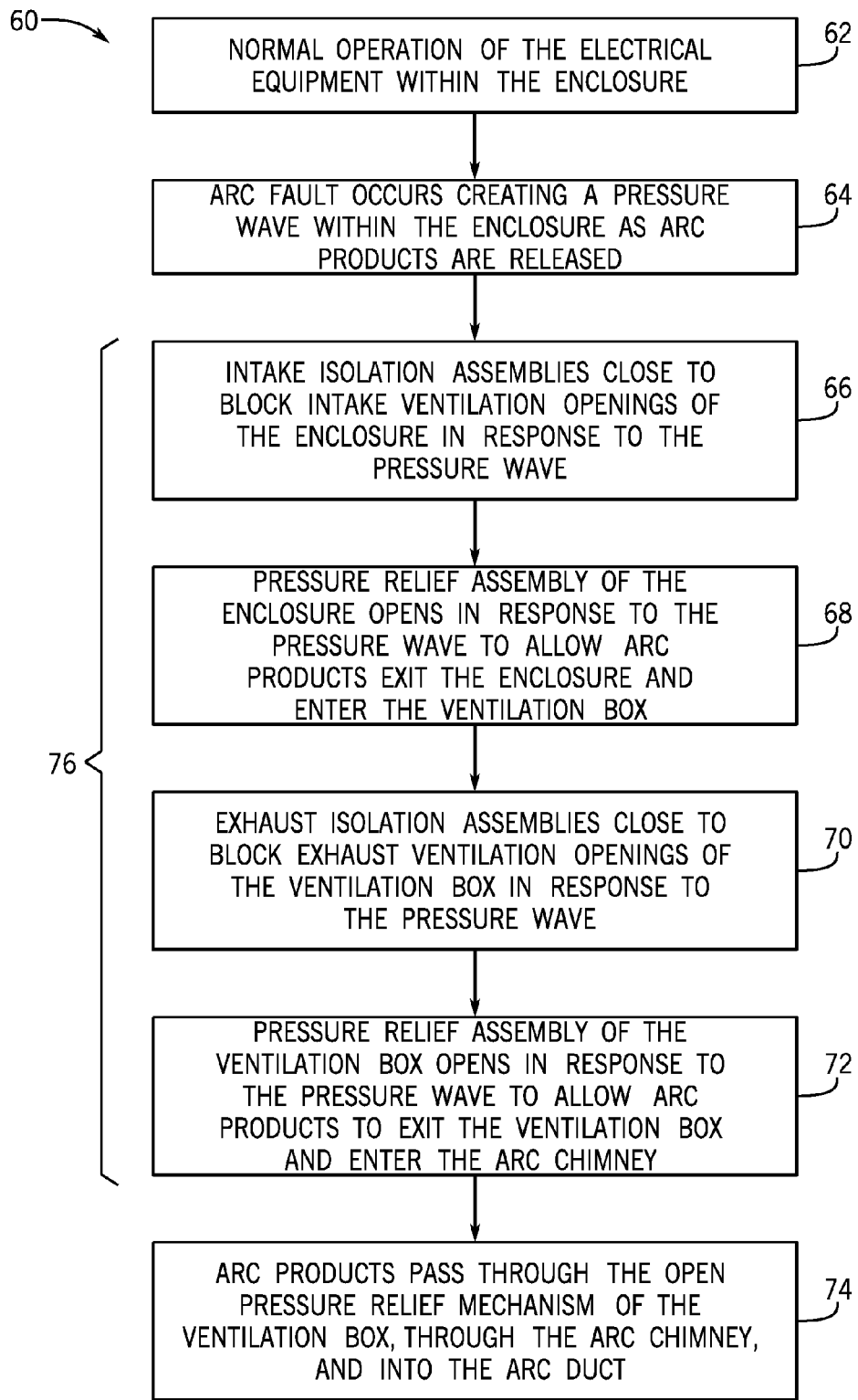
FIG. 3 is a flow diagram of a process whereby an arc resistant system contains and routes arc products in the event that the electrical equipment experiences an arc fault, in accordance with an embodiment of the present disclosure.
Figure 4:
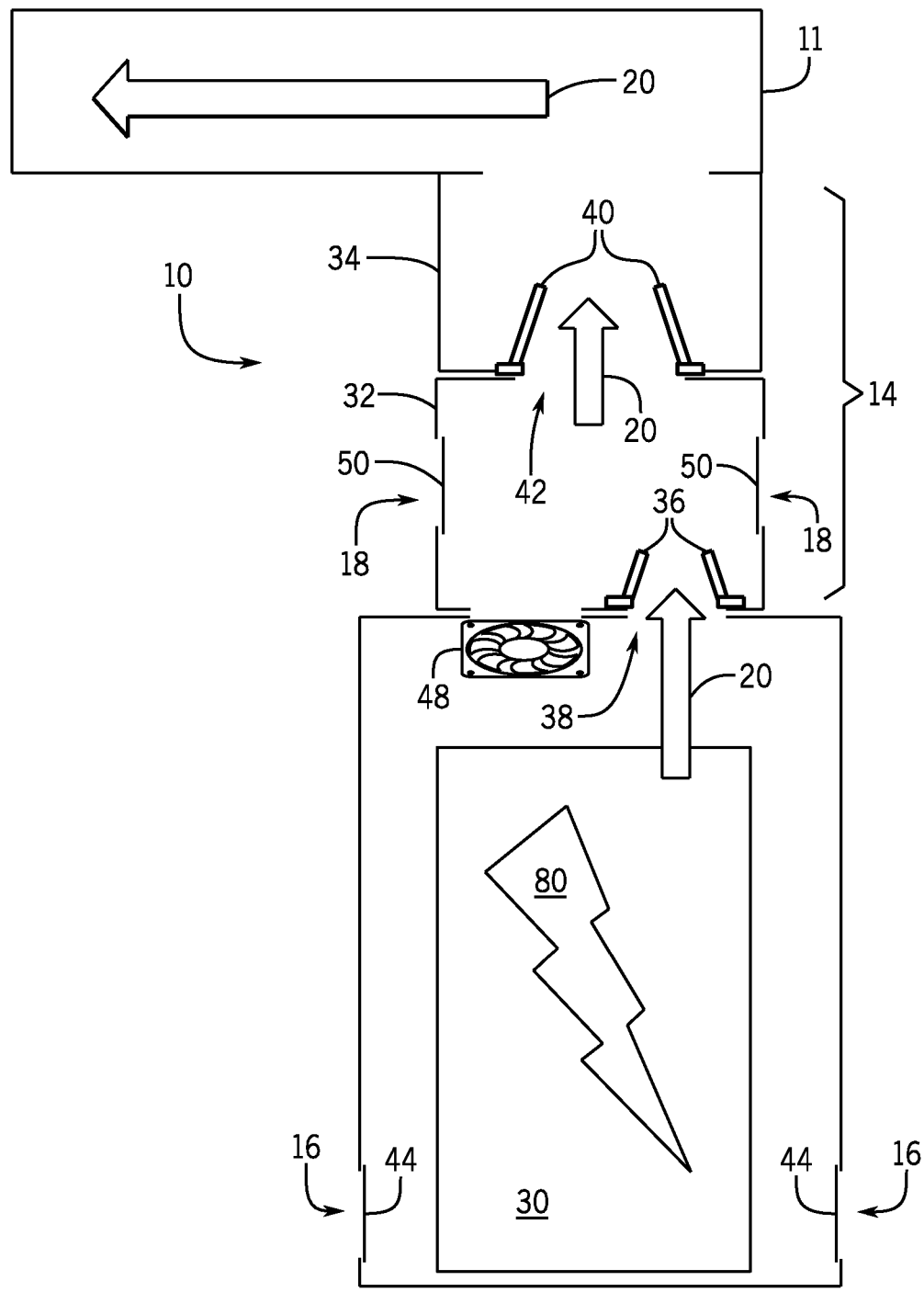
FIG. 4 is a cross-sectional schematic of the arc resistant system of FIG. 2 after the electrical equipment has experienced an arc fault, in accordance with an embodiment of the present disclosure.

FIG. 3 is a flow diagram of a process 60 whereby the arc resistant system 10 contains and routes arc products in the event that the electrical equipment 30 experiences an arc fault, in accordance with an embodiment of the present disclosure. For illustrative purposes, FIG. 3 is discussed relative to FIG. 2 and FIG. 4. FIG. 4 is a cross-sectional schematic of the arc resistant system 10 of FIG. 2, after the electrical equipment 30 has experienced an arc fault 80, in accordance with an embodiment of the present disclosure. It may be appreciated that the arc resistant system 10 is generally designed to provide isolation during one arc fault event, after which, it is understood that the affected enclosure 12, the electrical equipment 30 contained therein, the intake and exhaust isolation assemblies 44 and 50, and the pressure relief assemblies 36 and 40 are removed and replaced.

The process 60 illustrated in FIG. 3 begins with normal operation (block 62) of the electrical equipment 30 within the enclosure 12, as is illustrated in FIG. 2. At some point during operation, an arc fault 80 occurs creating a pressure wave within the enclosure 12 as arc products 20 are released (block 64). Subsequently, the arc resistant system 10 responds to the aforementioned arc fault pressure wave, as illustrated by blocks 66, 68, 70, and 72 of FIG. 3, to contain the arc products 20 and to route them away from the equipment 30. FIG. 4 illustrates the arc resistant system 10 after response to an arc fault. For example, the intake isolation assemblies 44 close (block 66) to substantially block intake ventilation openings 16 of the enclosure 12 in response to the pressure wave of the arc fault 80. As illustrated in FIG. 4, and discussed in greater detail below, the intake isolation assemblies 44 are pressed against the intake ventilation openings 16 such that the arc products 20 generated by the electrical equipment 30 are substantially blocked from exiting the enclosure 12 via the intake ventilation openings 16. Additionally, as illustrated in FIGS. 3 and 4, the pressure relief assembly 36 that had been blocking the arc ventilation opening 38 of the enclosure 12 opens (block 68) in response to the pressure wave of the arc fault 80 to allow arc products 20 exit the enclosure 12 and enter the ventilation box 32 via the arc ventilation opening 38.

As illustrated in FIGS. 3 and 4, once the pressure wave of the arc fault 80 enters the ventilation box 32, the exhaust isolation assemblies 50 close (block 70) to substantially block the exhaust ventilation openings 18 of the ventilation box 32 in response to the pressure wave of the arc fault 80. As illustrated in FIG. 4, and discussed in greater detail below, the exhaust isolation assemblies 50 are pressed against the exhaust ventilation openings 18 such that arc products 20 are substantially blocked from exiting the ventilation box 32 via the exhaust ventilation openings 18. Additionally, as illustrated in FIGS. 3 and 4, the pressure relief assembly 40 of the ventilation box 32 that had blocked the arc ventilation opening 42 of the ventilation box 32 opens (block 72) in response to the pressure wave of the arc fault 80 to allow the arc products 20 to exit the ventilation box 32 and enter the arc chimney 34. Finally, as illustrated in FIGS. 3 and 4, the arc products 20 pass through the arc ventilation opening 42 of the ventilation box 32, through the arc chimney 34, and into the arc duct 11 (block 74).

The time window that extends from immediately after the arc fault occurrence (block 64) to just before the arc products 20 pass into the arc duct 11 (block 74), identified by the bracket 76 in FIG. 3, may be referred to herein as the response time of the arc resistant system 10. In other words, the response time of the arc resistant system 10 may be defined by the time window in which the arc resistant system 10 performs the actions described by blocks 66, 68, 70, and 72. For example, in certain embodiments, the arc resistant system 10 may be designed to have a response time of less than 1 second (e.g., less than 20 milliseconds, between 8 milliseconds and 16 milliseconds). It may be appreciated that the response time of the arc resistant system 10 may depend, at least in part, on the volume of the enclosure 12 and ventilation box 32, the pressure change threshold at which the intake and exhaust isolation assemblies 44 and 50 close, and the pressure change threshold at which the pressure relief mechanisms 36 and 40 open.

Figure 5:
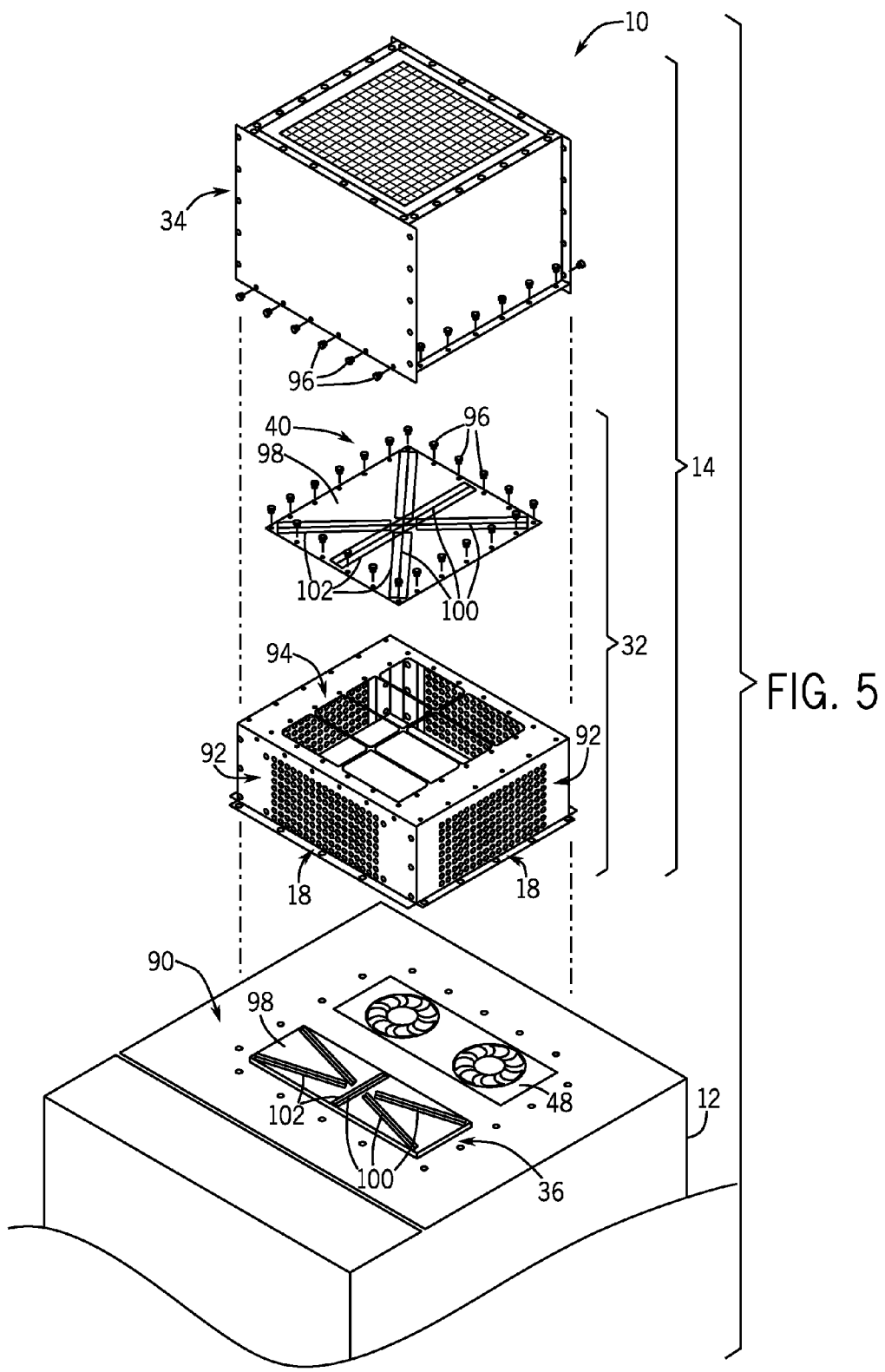
FIG. 5 is a partially exploded perspective view of an arc resistant system, in accordance with an embodiment of the present disclosure.

FIG. 5 is a partially exploded perspective view of the arc resistant system 10, in accordance with an embodiment of the present disclosure. The arc resistant system 10 illustrated in FIG. 5 includes an enclosure 12 and a ventilation system 14. The illustrated enclosure 12 includes the aforementioned electrical equipment disposed within (not shown), and includes a pressure relief mechanism 36 and a fan 48 disposed on a top side 90 of the enclosure 12. The illustrated ventilation system 14 includes a ventilation box 32 whose sides 92 all have exhaust ventilation openings 18, which are discussed in greater detail with respect to FIG. 6. The illustrated pressure relief assembly 40 couples to the top side 94 of the illustrated ventilation box 32 using screws 96, as illustrated, or another suitable coupling mechanism. The illustrated ventilation system 14 also includes an arc chimney 34 that is designed to be coupled to the ventilation box 32 using screws 96, as illustrated, or another suitable coupling mechanism. It may be appreciated that there may be additional gasket or sealing material disposed in the seams, cracks, or openings between all of the individual components and sub-components of the arc resistant system 10 to enable or enhance containment and redirection of the arc fault pressure wave.

The illustrated pressure relief assemblies 36 and 40 are each made from a ductile metal plate 98 that may be, for example, thin-gauge aluminum or steel. As illustrated, the plate 98 includes a number of weakened portions 100 that enable the plate 98 to plastically deform and/or break in response to the arc fault pressure wave. Plastic deformation, as used herein, refers to the deformation of a material undergoing non-reversible changes of shape in response to applied forces. The weakened portions 100 of the plates 98 may be, for example, grooves, scores, incisions, slits, perforations, or cuts that are formed in the plates 98 using, for example, laser cutting, metal stamping, water jet cutting, electrical discharge machining, or another suitable operation. Additionally, for the illustrated embodiment, the pressure relief assemblies 36 and 40 each include a reinforcement material 102 (e.g., aluminum tape) disposed over the weakened portions 100. For embodiments in which the weakened portions 100 do not extend through the entire thickness of the plates 98, the reinforcement material 102 may optionally be used to tune the strength of the plate 98 such that it plastically deforms and opens (e.g., bursts, breaks, ruptures) at the weakened portions 100 in response to the arc fault pressure wave (e.g., in response to a pressure change greater than a threshold value). For embodiments in which the weakened portions 100 extend through the entire thickness of the plates 98, the reinforcement material 102 may additionally seal the weakened portions 100 to block (e.g., limit, restrict, prevent) air flow across the plate 98 until the plate 98 is ruptured by the pressure wave of the arc fault. As such, the pressure relief assemblies 36 and 40 are designed to open in response to a pressure change that is beyond a threshold pressure change, and the threshold pressure change may depend on the thickness and stiffness of the plates 98, the orientation and dimensions of the weakened portions 100, the strength of the reinforcement material 102, or a combination thereof.

FIG. 6 an exploded perspective view of the ventilation box 32 of the arc resistant system 10, in accordance with an embodiment of the present disclosure. For illustrative purposes, the ventilation box 32 illustrated in FIG. 6 is inverted relative to the ventilation box 32 illustrated in FIG. 5. As previously discussed, the ventilation box 32 of FIG. 6 includes a top portion 94 that is coupled to the four side portions 92, wherein each side portion 92 includes exhaust ventilation openings 18. Further, the illustrated ventilation box 32 also includes four inner plates 108 of the exhaust isolation assemblies 50, one coupled to each of the side portions 92 of the ventilation box using the brackets 110. As discussed in greater detail below, the exhaust isolation assemblies 50 are designed to deform as a result of the pressure wave of the arc fault to bring the exhaust isolation assemblies 50 into contact with the exhaust ventilation openings 18 to block the escape of arc products from the ventilation box 32.

FIG. 7 is a schematic of an exhaust isolation assembly 50 of the arc resistant system 10, in accordance with an embodiment of the present disclosure. It may be appreciated that, in certain embodiments, the arc resistant system 10 may include intake isolation assemblies 44 having the same general design and functionality as the exhaust isolation assemblies 50 illustrated in FIGS. 7-9. For the illustrated exhaust isolation assembly 50 of FIG. 7, the brackets 110 couple the inner plate 108 of the exhaust isolation assembly 50 to the side portion 92 of the ventilation box 32, while maintaining a space between a blocking portion 120 of the exhaust isolation assembly 50 and the side portion 92 to allow warm air to exit the ventilation box 32 during normal operation of the electrical equipment. The inner plate 108 further includes a deformable portion 122 that, as discussed below with respect to FIGS. 7 and 8, are able to deform in response to the arc fault pressure wave to enable the blocking portion 120 to substantially cover and block the exhaust ventilation openings 18 of the ventilation box.

Further, the exhaust ventilation openings 18 of the side portion 92 of the ventilation box 32 illustrated in FIG. 7 are offset from openings 124 of the blocking portion 120 of the inner plate 108 such that the blocking portion 120 of the inner plate 108 can substantially block the egress of arc products though the ventilation openings 18 once the blocking portion 120 is brought into contact with the side portion 92 of the ventilation box 32. In other words, as a result of this offset, an object attempting to pass straight through the exhaust ventilation openings 18 would not be able to pass directly through the openings 124 of the blocking portion 120 of the inner plate 108, or vice versa coming from the other direction. While other embodiments of the exhaust isolation assembly 50 may include an inner plate 108 that lacks openings, the openings 124 of the illustrated blocking portion 120 of FIG. 7 enable greater exhaust airflow during normal operation of the electrical equipment without interfering with the ability of the blocking portion 120 to substantially seal the exhaust ventilation openings 18 of the side portion 92 of the ventilation box 32 in response to the pressure wave of the arc fault.

FIG. 8 is a perspective view of an exhaust isolation assembly 50 of the arc resistant system 10 in an open position, in accordance with an embodiment of the present disclosure. As mentioned above, while the exhaust isolation assembly 50 is illustrated and discussed with respect to FIGS. 8 and 9, it may be appreciated that the intake isolation assemblies 44 of the enclosure 12 (illustrated in FIG. 2) may be substantially similar to or exactly the same as the exhaust isolation assembly 50 discussed below, with the primary difference being the direction of air flow when in an open position. Like the exhaust isolation assembly 50 of FIG. 7, the exhaust isolation assembly 50 illustrated in FIG. 8 includes few components. In addition, the components of the exhaust isolation assembly 50 may not typically move during normal operation and thus, may avoid failure from fatigue. Moreover, the simple method of operation of the exhaust isolation assembly 50 reduces the possibility of failure during an arc fault. Thus, various embodiments of isolation assemblies described herein may be reliable, robust, durable, and inexpensive.

Like the exhaust isolation assemblies 50 discussed above, the exhaust isolation assembly 50 illustrated in FIG. 8 includes an inner plate 108 that is secured to the side portion 92 of the ventilation box 32 via brackets 110. As illustrated in FIG. 8, the brackets 110 maintain a spacing 130 between the inner plate 108 and the side portion 92 of the ventilation box 32 to allow warm air 46 to exit the side portion 92 of the ventilation box 32 when the exhaust isolation assembly 50 is in an open position. In addition, the separation distance 130 does not to exceed the distance the deformable portions 122 are capable of carrying the blocking portion 120 in response to an arc fault. In certain embodiments, the separation distance 130 may be between approximately 3 mm to 20 mm, 5 mm to 15 mm, or 8 mm to 12 mm. Moreover, the mounting brackets 110 may be attached to the side portion 92 of the ventilation box 32 using a variety of methods including, but not limited to, welding and mechanical fasteners, such as bolts 132.

The inner plate 108 of the exhaust isolation assembly 50 may be made from various ductile metals, including, but not limited to, aluminum and steel. Other flexible, flame resistant materials may also be used. In addition, the inner plate 108 may have a thickness 134 between approximately 0.5 mm to 5 mm, 0.75 mm to 3 mm, or 1 mm to 2 mm (e.g., 16-gauge). Further, the inner plate 108 includes a blocking portion 120 and one or more deformable portions 122. The blocking portion 120 is configured to substantially block the exhaust ventilation openings 18 in the event of an arc fault. For example, the blocking portion 108 may be sized to cover the exhaust ventilation openings 18. In certain embodiments, the blocking portion 120 of the inner plate 108 may include raised features that fit into (e.g., extend into, connect with, mate with) at least a portion of the exhaust ventilation openings 18.

For the embodiment shown in FIG. 8, the blocking portion 120 of the inner plate 108 is generally flat and does not include any openings. Alternatively, as discussed above, the blocking portion 122 may include openings (e.g., openings 124 illustrated in FIG. 7) that are offset from the exhaust ventilation openings 22 to facilitate greater exhaust air flow during normal operation, while not diminishing the ability of the blocking portion 120 to substantially seal the exhaust ventilation openings 18 in response to an arc fault.

The deformable portions 122 of the illustrated exhaust isolation assembly 50 are designed to deform in response to the arc fault pressure wave. In other words, the deformable portions 122 plastically deform to carry the blocking portion 120 of the inner plate 108 toward the exhaust ventilation openings 18. After the deformable portions 122 have deformed and carried the blocking portion 120 to cover the exhaust ventilation openings 18, the blocking portion 120 will remain in contact with the exhaust ventilation openings 18 even after the pressure from the arc fault dissipates as the arc products are directed toward the arc duct. In the illustrated embodiment, the deformable portions 122 include one or more slits 136 cut into the inner plate 108. As described in detail below, the slits 136 of the deformable portions 122 open (e.g., stretch, bend, change) in response to force being applied to the blocking portion 120 by the arc fault pressure wave. The slits 136 of the deformable portions 122 may be cut into the inner plate 108 using a variety of methods including, but not limited to, laser cutting, water jet cutting, stamping, and electrical discharge machining. Further, the slits 136 of the deformable portions 122 may be designed to extend either entirely or partially through the inner plate 108. The arrangement, spacing, and/or pattern of the slits 136 may be configured to enable the deformable portions 122 to deform enough to carry the blocking portion 120 to the exhaust ventilation openings 18.

With the foregoing in mind, FIG. 9 is a perspective view of the exhaust isolation assembly 50 of FIG. 8 in a closed position after an arc fault has occurred, in accordance with an embodiment of the present disclosure. As described above, the temperatures reached during an arc fault may be high enough to cause metal to melt and even to vaporize. The change in state from solid to gas results in a large increase in volume, which may cause a large pressure wave 140. For example, copper going from a solid to a gas may increase in volume over 64,000 times. Therefore, the pressure inside the enclosure 12 and ventilation box 32 after an arc fault may increase by approximately 30, 50, 75, or 100 kilopascals (gauge pressure) or more in less than 1 second (e.g., less than 15 milliseconds). The pressure wave 140 may extend in all directions from the vaporizing metal and be exerted on the blocking portion 120 of the inner plate 108 of the exhaust isolation assembly 50, carrying it toward the exhaust ventilation openings 18 and substantially blocking the exhaust ventilation openings 18. In other words, the blocking portion 120 of the exhaust isolation assembly 50 is displaced by the force of the pressure wave 80 until the separation distance 130 between the blocking portion 120 and the inside surface of the side 92 of the ventilation box 32, as illustrated in FIG. 8, is minimized or reduced to zero. Thus, the escape of arc products through the exhaust ventilation openings 18 is blocked (e.g., minimized or completely eliminated).

The slits 136 of the deformable portions 122 illustrated in FIG. 8 stretch into openings 142 illustrated in FIG. 9 to enable the blocking portion 120 to move toward the side portion 92 of the ventilation box 32. The openings 142 enable the deformable portions 122 to deform, or stretch, without breaking or separating from the blocking portion 120. In addition, because the deformable portions 122 undergo plastic deformation, the deformable portions 122 remain deformed even after the pressure wave 140 has dissipated, keeping the blocking portion 120 against the exhaust ventilation openings 18. In addition, the configuration of the slits 136 in the deformable portions 122, the material selected for the inner plate 108, and the thickness 134 of the inner plate 108 may be adjusted to enable the blocking portion 120 to be carried to the exhaust ventilation openings 18 as quickly as the arc fault pressure wave 80 develops, minimizing the escape of arc products. In other embodiments, the blocking portion 120 of the inner plate 108 may be formed from a more rigid material and the deformable portions 120 are formed from a more malleable material. In further embodiments, the blocking portion 120 and deformable portions 122 may differ in composition (e.g. different metals), thickness, and/or be formed from separate pieces that are then joined together.

While only certain features of the invention have been illustrated and described herein, many modifications and changes will occur to those skilled in the art. It is, therefore, to be understood that the appended claims are intended to cover all such modifications and changes as fall within the true spirit of the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An arc resistant system, comprising:
   an enclosure that houses electrical equipment, wherein the enclosure comprises:
   an intake ventilation opening that allows a cooling flow of air to enter the enclosure during normal operation of the electrical equipment;
   an intake isolation assembly coupled about the intake ventilation opening, wherein the intake isolation assembly is configured to deform in response to an arc fault pressure wave to substantially block the intake ventilation opening; and
   a first pressure relief assembly configured to open in response to the arc fault pressure wave to allow arc products to exit the enclosure and to enter a ventilation box; and
   the ventilation box coupled to the enclosure, wherein the ventilation box comprises:
   an exhaust ventilation opening that allows the cooling flow of air to exit the ventilation box during normal operation of the electrical equipment;
   an exhaust isolation assembly coupled about the exhaust ventilation opening, wherein the exhaust isolation assembly is configured to deform in response to the arc fault pressure wave to substantially block the exhaust ventilation opening; and
   a second pressure relief assembly configured to open in response to the arc fault pressure wave to allow the arc products to exit the ventilation box.

2. The system of claim 1, wherein each of the intake isolation assembly, the exhaust isolation assembly, the first pressure relief assembly, and the second pressure relief assembly does not include springs, hinges, or motors.

3. The system of claim 1, wherein the first pressure relief assembly and the second pressure relief assembly each comprise a steel or aluminum plate that is configured to rupture and open in response to the arc fault pressure wave, and wherein a thickness of the steel or aluminum plate defines a threshold pressure change capable of rupturing and opening the steel or aluminum plate.

4. The system of claim 1, wherein the first pressure relief assembly and the ventilation box are coupled to a top face of the enclosure.

5. The system of claim 4, comprising a fan coupled to the top face of the enclosure, wherein the fan is configured to draw the cooling flow of air into the enclosure through the intake ventilation opening and to exhaust the cooling flow of air from the ventilation box through the exhaust ventilation opening.

6. The system of claim 1, wherein the second pressure relief assembly is coupled to a top face of the ventilation box.

7. The system of claim 1, wherein the intake isolation assembly comprises a deformable portion and a blocking portion, wherein the deformable portion is configured to deform in response to the arc fault pressure wave to move the blocking portion to substantially cover an interior surface of the intake ventilation opening to substantially block the intake ventilation opening.

8. The system of claim 1, wherein the exhaust isolation assembly comprises a deformable portion and a blocking portion, wherein the deformable portion is configured to deform in response to the arc fault pressure wave to move the blocking portion to substantially cover an interior surface of the exhaust ventilation opening to substantially block the exhaust ventilation opening.

9. The system of claim 1, wherein the intake isolation assembly is disposed within the enclosure and coupled to an interior surface of the enclosure.

10. The system of claim 1, wherein the exhaust isolation assembly is disposed within the ventilation box and coupled to an interior surface of the ventilation box.

11. The system of claim 1, wherein the enclosure comprises:
    a second intake ventilation opening that allows the cooling flow of air to enter the enclosure during normal operation of the electrical equipment; and
    a second intake isolation assembly coupled about the second intake ventilation opening, wherein the second intake isolation assembly is configured to deform in response to the arc fault pressure wave to substantially block the second intake ventilation opening.

12. The system of claim 1, wherein the ventilation box comprises:
    a second exhaust ventilation opening that allows the cooling flow of air to exit the ventilation box during normal operation of the electrical equipment; and
    a second exhaust isolation assembly coupled about the second exhaust ventilation opening, wherein the second exhaust isolation assembly is configured to deform in response to the arc fault pressure wave to substantially block the second exhaust ventilation opening.

13. An arc resistant system, comprising:
    a ventilation box, comprising:
    a first side configured to be coupled to an enclosure of the arc resistant system that houses electrical equipment, wherein the ventilation box is configured to receive a cooling flow of air from a fan of the enclosure during normal operation of the electrical equipment, and to receive arc products of the electrical equipment from the enclosure during an arc fault of the electrical equipment via the first side;
    a second side that includes an exhaust isolation assembly coupled about an interior of an exhaust ventilation opening of the ventilation box, wherein the exhaust ventilation opening is configured to exhaust the cooling flow of air from the ventilation box during the normal operation of the electrical equipment, and wherein the exhaust isolation assembly is configured to deform to substantially block the exhaust ventilation opening in response to the ventilation box receiving the arc products of the electrical equipment; and a third side configured to be coupled to an arc chimney of the arc resistant system, wherein the third side includes a pressure relief assembly configured to open to allow the arc products to exit the ventilation box and to enter the arc chimney in response to the ventilation box receiving the arc products of the electrical equipment.

14. The system of claim 13, wherein the ventilation box comprises a fourth side that includes an additional exhaust isolation assembly coupled to an additional exhaust ventilation opening of the ventilation box, wherein the additional exhaust ventilation opening is also configured to exhaust the cooling flow of air from the ventilation box during the normal operation of the electrical equipment, and wherein the additional exhaust isolation assembly is configured to deform to substantially block the additional exhaust ventilation opening in response to the ventilation box receiving the arc products of the electrical equipment.

15. The system of claim 13, comprising the enclosure of the arc resistant system that houses the electrical equipment, wherein the enclosure comprises an intake isolation assembly coupled to an interior surface of an intake ventilation opening of the enclosure, wherein the intake isolation assembly is configured to deform in response to the electrical equipment generating the arc products within the enclosure to substantially block the intake ventilation opening.

16. The system of claim 15, wherein the enclosure comprises a second pressure relief assembly configured to open in response to the electrical equipment generating the arc products within the enclosure to allow the arc products to exit the enclosure and to enter the ventilation box.

17. The system of claim 15, wherein the enclosure comprises the fan, and wherein, during normal operation of the electrical equipment, the fan is configured to draw the cooling flow of air into the enclosure through the intake ventilation opening, to provide the cooling flow of air from the enclosure into the ventilation box, and to exhaust the cooling flow air from the ventilation box through the exhaust ventilation opening.

18. A method of operating an arc resistant system, comprising:
- operating electrical equipment within an enclosure of the arc resistant system that is coupled to a ventilation box of the arc resistant system;
- operating a fan coupled to the enclosure, wherein the fan draws air into an intake ventilation opening of the enclosure and exhausts air from an exhaust ventilation opening of the ventilation box to remove heat generated by the electrical equipment during normal operation;
- closing an intake isolation assembly to substantially block the intake ventilation opening of the enclosure in response to a pressure wave generated as arc products are released from an arc fault of the electrical equipment;
- opening a first pressure relief assembly that is coupled to the enclosure to allow the arc products to exit the enclosure and to enter the ventilation box in response to the pressure wave;
- closing an exhaust ventilation assembly to substantially block the exhaust ventilation opening of the ventilation box in response to the pressure wave; and
- opening a second pressure relief assembly that is coupled to the ventilation box to allow the arc products to exit the ventilation box in response to the pressure wave.

19. The method of claim 18, wherein all of closing the intake ventilation assembly, opening the first pressure relief assembly, closing the exhaust ventilation assembly, and opening a second pressure relief assembly occurs less than 1 second after generating the pressure wave.

20. The method of claim 19, wherein all of closing the intake ventilation assembly, opening the first pressure relief assembly, closing the exhaust ventilation assembly, and opening a second pressure relief assembly, occurs less than 20 milliseconds after generating the pressure wave.

\* \* \* \* \*